United States Patent Office 3,243,046
Patented Mar. 29, 1966

3,243,046
FLOATATION APPARATUS
Yoshiaki Kakumoto, Chigasaki-shi, and Kazuo Tsukagoshi, Tokyo, Japan, assignors to Ebara-Infilco Kabushiki Kaisha, Tokyo, Japan, a corporation of Japan
Filed Nov. 26, 1963, Ser. No. 326,061
Claims priority, application Japan, Dec. 1, 1962, 37/53,468
1 Claim. (Cl. 210—199)

This invention relates to a pretreatment method used prior to a floatation process. More particularly this invention relates to a pretreatment method which uses a liquid-by-liquid ejector prior to operations such as the separation of a specific solid matter from a mixture of various solid matters suspended in a liquid, the classification of solid matters into a graded size range (froth floatation is an example of these operations) or separation, concentration, removal, etc. of floating matter, such as, oil, fat, and the like from liquid which are all conducted by dissolving compressed gas in a liquid, to make the gas cling to separating matter to be separated and thereby make such matter floatable.

An object of the present invention is to provide an apparatus by which the following four purposes are fulfilled simultaneously in one apparatus with a separation efficiency better than any of conventional methods by utilizing ingeniously the pressure energy of a liquid containing compressed gas. The above-mentioned purposes are as follows:

(1) To fully utilize the pressure energy of the compressed gas in the liquid, (2) To generate fine bubbles by reduction of the pressure of the liquid containing the compressed gas, (3) To mix the liquid containing the compressed gas with raw liquid, and (4) To make fine bubbles of generated gas cling to the floating matter, such as oil, fat, or the like.

In a conventional pretreatment method for floatation in which the pressure of compressed-gas-dissolved liquid is reduced through a reducing valve and a liquid containing fine bubbles of liberated gas and floating matters are admixed with another liquid at the bottom of a floatation cell, the separation efficiency is fairly good in a small scale plant, but when the capacity of the floatation cell is large, the separation efficiency is greatly reduced and cannot be applied for commercial purposes, because the effective surface area of the gas bubbles is reduced by means of their enlargement whereby they lose their clinging ability to separating matter during the course from pressure reduction to mixing with another liquid. This invention has, in one aspect, an object of providing an apparatus which overcomes the above-mentioned drawbacks by employing a liquid-by-liquid ejector in the place of a reducing valve. Namely in the pretreatment of operations such as froth floatation, or separation by floatation, etc. which utilize fine bubbles generated at reduction of pressure of compressed-gas-dissolved liquid in making separating matters float, this invention uses a liquid-by-liquid ejector by which there is improved mixing with the compressed-gas dissolved liquid of the liquid sucked in by reduced pressure due to the energy change of the compressed-gas-dissolved liquid from a pressure head to a velocity head while simultaneously there is obtained clinging of fine bubbles of generated gas with floating matter, such as fat, oil, fiber or the like.

The process and apparatus of the present invention will be more fully understood by the following description taken in conjunction with the accompanying drawings.

In one embodiment of the present invention of which explanation is given hereinafter, air is used as an example of the gas employed. Though there are various combinations of compressed-air-dissolved liquid and the non-compressed liquid explanations will be given where the compressed-air-dissolved liquid is one part of raw liquid and non-compressed liquid is the remaining parts of the same raw liquid.

Figure 1:
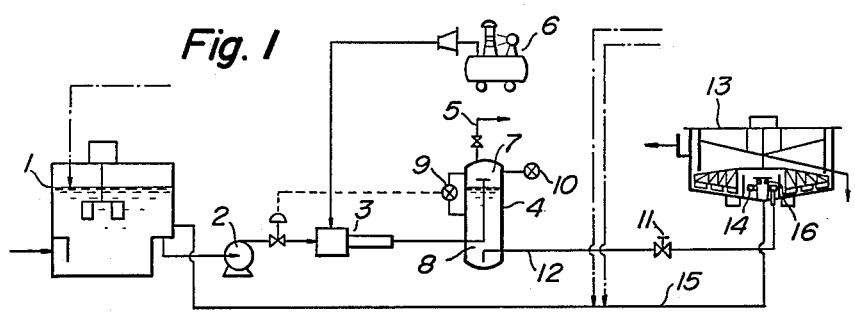
FIG. 1 is a diagrammatic arrangement of one example of conventional floatation process.

In FIG. 1, one part of the original liquid from a stirrer equipped raw liquid vessel 1 with a stirrer is supplied to the driving side of an air-by-liquid ejector 3 via a pump 2. An air mixture consisting of surplus air discharged from an air outlet pipe 5 and supplementary air from an air compressor 6 is introduced into the suction chamber of the air-by-liquid ejector 3. In other words, the air dissolving vessel 4 acts as a separator for surplus air in the liquid while working in cooperation with the air-by-liquid ejector 3 in dissolving compressed air. The vessel 4 contains a gas phase 7 and a liquid phase 8 and the boundary between the air and the liquid is controlled at a definite level by surface regulator 9. At the same time, the pressure of the air phase is controlled by a pressure regulator 10.

In the conventional method, the thus obtained compressed air-dissolved liquid reaches, as shown in FIG. 1, a reducing valve (sluice valve) 11. One part of fine bubbles generated here by pressure reduction flows while clinging to floating matter in the liquid, and the liquid which contains bubbles and floating matter is discharged from a sparger ring 14 of a solution mixer installed at the bottom of a floatation cell 13. On the other hand, when non-compressed liquid from the raw liquid vessel 1 flows out of openings 16 provided at the end of the inlet pipe 15, the above-mentioned bubbles in the liquid from the sparger ring 14 cling to floating matter in the non-compressed liquid by which floating matter in the total liquid ascending the cell form at the upper part of the liquid in the cell as scum by the buoyancy of the bubbles. Thus concentration and separation are performed, if the capacity of the floatation cell is very small.

However when the capacity of the floatation cell is large, the bubbles grow in size accordingly and reduce their effective area. Consequently, the clinging ability of the bubbles to floating matter in the non-compressed liquid and the degree of floatation and separation are reduced. Furthermore, the function as a solution mixer is also not good because the space which allows the bubbles to cling to floating matter is too large in comparison with the energy maintained by them.

Figure 2:
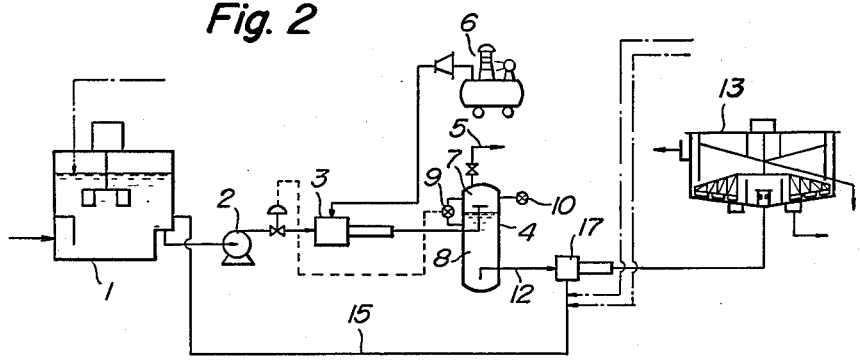
FIG. 2 is a diagrammatic arrangement of the present process.

With reference to FIG. 2 according to the method of the invention, instead of the above-mentioned reducing valve (sluice valve) 11, a liquid-by-liquid ejector 17 is used, and the sparger ring 14 is eliminated. By employing the compressed-air-dissolved liquid which flows in the pipe 12 from the air dissolving vessel 4 as a jet stream in ejector 17, fine bubbles of air are generated at an instant when the pressure head of the liquid is converted to velocity head. On the other hand, the non-compressed liquid is sucked by reason of pressure reduction generated in the suction chamber of the liquid-by-liquid ejector from a non-compressed-liquid-flowing pipe connected with this suction chamber. Violent turbulent flow is then produced and while passing the throat and the diffuser of the liquid-by-liquid ejector 17, mixing of two solutions is instantaneously and intimately conducted and simultaneously bubbles completely cling to the floating matter and are conveyed to the floatation cell 13. Accordingly even if the liquid-by-liquid ejector is installed at a distant location, such a problem as difficulty of clinging of bubbles due to their growth does not occur.

The invention will be illustrated in greater detail in connection with the following specific example.

EXAMPLE

When floatation is used for separating solid particles of magnesium hydroxide from a mother liquor, e.g., in the process of magnesia clinker production from sea water, it is required to make bubbles generated by a pressure reduction cling to magnesium hydroxide in the solution for reaction purposes. The process of the present invention has brought a splendid success to this pretreatment.

When sea water free from carbonic acid and a slurry of slaked lime are introduced into a reaction vessel while maintaining the pH of the liquid at 10.2 to 10.3 at room temperature and a slurry of magnesium hydroxide is continuously discharged after a retention time of 20 minutes, 1.02 g. of the total 1.2 g. $Mg^{++}$ in 1 l. of sea water free from carbonic acid reacts with $OH^-$ of the slaked lime, and changes into 2.45 g. of magnesium hydroxide and 0.18 g. of $Mg^{++}$ remains. The resulting magnesium hydroxide slurry is introduced at a rate of 50 kg./min. into a stirrer-equipped raw liquor vessel 1 and 0.2 percent dilute solution of soap as surfactant is added thereto at a rate of 16 kg./hr. and will be mixed with the magnesium hydroxide slurry. Then 27 percent by weight of the mixed solution (13.6 kg./min.) is sent to the driving side of air-by-liquid ejector 3 by a pump 2 and air compressed at a pressure of 4.8 to 5.0 kg./cm.$^2$ gauge by a compressor 6 is drawn from the suction side of the ejector 3. Passing through the throat and the diffuser of the ejector 3, the mixture enters an air dissolving vessel 4 in which the slurry is sufficiently saturated with air for a retention time of one minute. This vessel contains a liquid phase 8 and the gas phase 7 and their boundary surface is controlled by liquid surface regulator 9 (e.g., Bourdon tube type) at a constant level. (In this case, the gas phase occupies 31%.) The gas phase pressure is maintained at 4 kg./cm.$^2$ (gauge) and excessive air is discharged through a vent 5. 13.6 kg./min. of the compressed-air-dissolved liquid thus obtained is sent, as shown in FIG. 1, from the air dissolving vessel 4, through a pipe 12 to a one inch reducing valve (sluice valve) 11. One part of fine bubbles generated here under the vacuum of 0.05 kg./cm.$^2$ clings to magnesium hydroxide in the liquid and remaining parts flow in the form of bubbles in the liquid and from a sparger ring 14 installed at a bottom of a floatation cell 13 to serve as a liquid-liquid mixing device. 13.6 kg./min. of the liquid containing bubbles and floating matter are discharged together. On the other hand 36.7 kg./min. of non-compressed liquid from the stirrer-equipped raw liquid vessel flows out of openings 16 together with a high molecular flocculent promoter such as an acrylamide polymer and polyamine which are introduced to the inlet pipe 15 as diagrammatically shown in FIG. 1 by the chain-dotted lines. At this time any remaining bubbles in the liquid coming from the sparger ring 14 cling to the magnesium hydroxide in the non-compressed liquid which is discharged through openings 16 by which the magnesium hydroxide in the total liquid ascending the cell forms by the buoyancy of bubbles an upper scum layer in the cell whereafter the magnesium hydroxide is concentrated and separated. The yield of magnesium hydroxide in the floatation cell is as shown in column A of the following table between 80 to 88 percent. However when a large scale plant is utilized having a capacity of 26 t./min. the recovery of magnesium hydroxide is only 55 to 60 percent, which is much lower than that of the pilot plant, as shown in column B of the table hereinafter described.

In the case of the pilot plant, the distance between the reducing valve 11 (sluice valve) and the sparger ring 14 in the floatation cell is 0.8 m., whereas in the case of the large scale plant treating 26 t./min. of liquid, the distance is 8 m. Although one part of the large amount of fine bubbles generated at the reducing valve 11 (sluice valve) clings to the magnesium hydroxide in the compressed-air-dissolved liquid and remaining bubbles are preserved for clinging to magnesium hydroxide in non-compressed liquid at a feed well of the floatation cell 13, the latter grow into larger bubbles as they flow on their way through the pipe from the reducing valve 11 (sluice valve) to the sparger ring 14 thereby extremely diminishing their effective surface area. Consequently the amount of fine bubbles to cling to magnesium hydroxide in the non-compressed liquid becomes smaller and the amount of magnesium hydroxide suspended in the liquid without being able to float increases. Further, the 13.6 kg./min. of liquid which is discharged out of the sparger ring 14 drops in pressure and the mixing of fine bubbles with the magnesium hydroxide in the non-compressed liquid of 35.7 kg./min. delivered from the openings 16 of the inlet pipe is found to be insufficient in the case of such a large capacity.

In order to overcome such a deficiency, we have found through tests in the pilot plant that when a liquid-by-liquid ejector 17 is used in the place of the reducing valve 11, excellent results are obtained in which 90 to 95% of magnesium hydroxide recovery is obtained as seen in columns C and D of the following table.

TABLE

*Efficiency comparison of magnesium hydroxide in floatation*

| A, percent | B, percent | C, percent | D, percent |
|---|---|---|---|
| 80-88 | 55-60 | 90-95 | 90-95 |

Note: A is the value when a reducing valve is used in the pilot plant.
B is the value when a reducing valve is used in the commercial plant.
C is the value when a liquid-by-liquid ejector is used in the place of the reducing valve in the pilot plant.
D is the value when a liquid-by-liquid ejector is used in the commercial plant.

In this case when 13.6 kg./min. of the compressed-air-dissolved liquid enters the nozzle of the driving side of the liq.-liq. ejector at a pressure of 4.2 kg./cm.$^2$ (gauge), the pressure head of the liquid is converted into a velocity head of 8.6 m./sec. and on account of this not only does the air which is dissolved under pressure break up into fine bubbles and one part of these bubbles immediately clings to magnesium hydroxide in the 13.6 kg./min. of the liquid discharged from the nozzle but also the bubbles cling to magnesium hydroxide in the remaining raw liquid of 36.7 kg./min. which is sucked into the suction chamber of the ejector under the influence of a vacuum of 0.05 kg./cm.$^2$ generated there together with high molecular flocculant promoters fed at the entrance of the suction side of the ejector. Further when the slurry discharged from the nozzle and the slurry which is sucked into the ejector, passes the throat of the ejector, turbulent mixing of both the slurries is performed due to energy exchange by which the surfactant and the flocculant promoters are uniformly distributed into a total slurry thereby to make the magnesium hydroxide seawater-phobic while simultaneously increasing the clinging ability of the bubbles. Since all the bubbles required by the magnesium hydroxide cling to it here it is unimportant if excessive bubbles grow to larger size. While this mixed slurry passes the diffuser and the successive pipe, flocculation of magnesium hydroxide particles proceeds to some extent and while the slurry enters the floatation cell and ascends from the feed well to the separation zone (ascending velocity 4.8 m./hr.), flocculation is further enhanced, and finally at the separation zone magnesium hydroxide clung with bubbles forms the upper layer as a scum and the mother liquid is withdrawn as a separated liquid.

In the liquid-by-liquid ejector, four functions are carried out instantaneously and simultaneously as follows:

(1) Fine air bubbles are generated as soon as the driving liquid passes through the nozzle of the liquid-by-liquid ejector, (2) Non-compressed liquid is introduced into the suction chamber of the liquid-by-liquid ejector, (3) The above mentioned both liquids are mixed together in the liquid-by-liquid ejector, and (4) Fine air bubbles are dispersed into the mixing liquid and absorb the suspended materials.

Figure 3:
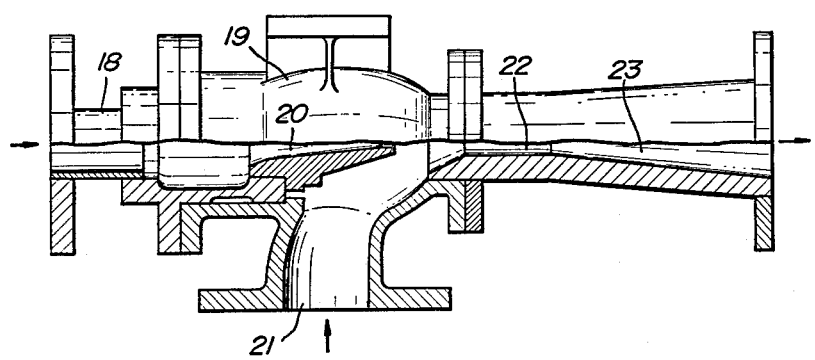
FIG. 3 is a cross-sectional view of the principal part of FIG. 2 showing a part thereof.

The liquid-by-liquid ejector used in the present invention is illustrated diagrammatically in FIG. 3 in which 18 is an inlet for driving liquid, 19 is the suction chamber from which the nozzle is detachable, 20 is a nozzle, 21 is an inlet for liquid to be sucked, 22 is a throat, and 23 is a diffuser. One liquid-by-liquid ejector is used for a pilot plant and two for a commercial plant.

What we claim is:

Apparatus for the treatment of liquid by floatation of solid matter in said liquid, said apparatus comprising a vessel for containing liquid from which solid matter is to be separated, means for removing a first portion of said liquid from said vessel, means for introducing compressed gas into said first portion of liquid, a conduit coupled to the vessel for conveying a further portion of said liquid from said vessel, liquid-by-liquid ejector means coupled to said conduit and to said removing means for mixing said portions of liquid together and producing fine air bubbles therein which cling to the solid matter in the liquid which is to be separated, said liquid-by-liquid ejector means comprising an ejector including an inlet portion coupled to the removing means for receiving said first portion of liquid with the compressed gas therein, a nozzle coupled to said inlet portion for receiving the liquid therefrom, said ejector having a suction chamber therein into which said conduit opens, said nozzle opening into said suction chamber to produce suction therein upon passage of said first liquid portion through the nozzle, said further liquid portion being drawn directly from said vessel by the suction in said suction chamber, said ejector further including a throat portion in communication with the suction chamber on the downstream side thereof and an outlet portion including a diffuser extending downstream of the throat portion, said liquid portions being turbulently mixed as they pass the throat portion of the ejector, said apparatus further comprising a floatation cell connected to said ejector outlet portion for receiving mixed discharged liquid therefrom, the solid matter in the liquid being separated by floatation in the cell as a result of the adherence of said matter with the fine gas bubbles, and means for directly introducing flocculation promoters into the conduit with said further portion of the liquid so that the flocculation promoters become mixed with said liquid portions in said ejector means.

References Cited by the Examiner

UNITED STATES PATENTS

| | | | |
|---|---|---|---|
| 2,381,760 | 8/1945 | Latham | 210—74 |
| 2,604,445 | 7/1952 | Lansing | 210—221 X |
| 2,765,919 | 10/1956 | Juell | 210—44 |
| 3,063,939 | 11/1962 | Katz | 210—525 X |
| 3,179,252 | 4/1965 | Vrablik | 210—221 X |

REUBEN FRIEDMAN, *Primary Examiner.*

MORRIS WOLK, *Examiner.*

J. DECESARE, M. E. ROGERS, *Assistant Examiners.*